US009994125B2

United States Patent
Magaña et al.

(10) Patent No.: US 9,994,125 B2
(45) Date of Patent: Jun. 12, 2018

(54) SYSTEM AND METHOD FOR VEHICLE SEAT MONITORING

(71) Applicant: Ford Global Technologies, LLC, Dearborn, MI (US)

(72) Inventors: Mauricio Magaña, Mexico City (MX); Paul Fernando Cepeda Rode, Mexico City (MX); Juan Palencia, Mexico City (MX); Alfredo Gutiérrez Torres, Mexico City (MX); Leonardo D. Reyes Chacalco, Mexico (MX)

(73) Assignee: Ford Global Technologies, LLC, Dearborn, MI (US)

( * ) Notice: Subject to any disclaimer, the term of this patent is extended or adjusted under 35 U.S.C. 154(b) by 115 days.

(21) Appl. No.: 14/993,872

(22) Filed: Jan. 12, 2016

(65) Prior Publication Data
US 2017/0197523 A1 Jul. 13, 2017

(51) Int. Cl.
*B60N 2/02* (2006.01)
*B60K 35/00* (2006.01)
(Continued)

(52) U.S. Cl.
CPC ............ *B60N 2/0244* (2013.01); *B60K 35/00* (2013.01); *B60N 2/20* (2013.01); *B60N 2/2213* (2013.01);
(Continued)

(58) Field of Classification Search
None
See application file for complete search history.

(56) References Cited

U.S. PATENT DOCUMENTS 6,669,286 B2  12/2003  Iusim
7,551,093 B2   6/2009  Maass
(Continued)

FOREIGN PATENT DOCUMENTS

EP   2957193       12/2015
JP   2007153035 A   6/2007
(Continued)

OTHER PUBLICATIONS

Ergonomic Guide to Driver Seat Fitting (How to Adjust Your Truck Seat) [online], retrieved on Nov. 25, 2015 from http://depts.washington.edu/ergoweb/SeatFittingGuide.pdf.
(Continued)

*Primary Examiner* — Thomas G Black
*Assistant Examiner* — Ana D Thomas
(74) *Attorney, Agent, or Firm* — James P. Muratt; Neal, Gerber & Eisenberg LLP

(57) ABSTRACT

Embodiments include a vehicle comprising a seat, a first sensor coupled to the seat for detecting a seat angle, and a processor communicatively coupled to the first sensor and the seat, and configured to output a control signal for correcting the seat angle if the seat angle is not within a predetermined range of values. Embodiments also include a method of correcting a position of a vehicle seat having an occupant seated therein. The method comprises receiving, at a processor, an output detected by a sensor unit coupled to the seat; comparing, using the processor, the output to a predetermined threshold to determine whether an alarm condition exists; if it does, outputting a control signal for correcting the seat position, wherein the sensor unit includes an angular position sensor.

20 Claims, 4 Drawing Sheets

(51) Int. Cl.
*B60N 2/20* (2006.01)
*B60N 2/22* (2006.01)
*B60N 2/44* (2006.01)

(52) U.S. Cl.
CPC ........ *B60N 2/44* (2013.01); *B60K 2350/1096* (2013.01); *B60N 2002/0268* (2013.01); *B60N 2002/0272* (2013.01); *B60N 2002/4485* (2013.01)

(56) References Cited

U.S. PATENT DOCUMENTS

| | | | |
|---|---|---|---|
| 8,725,311 | B1 | 5/2014 | Breed |
| 2005/0055145 | A1 | 3/2005 | Bober et al. |
| 2014/0316661 | A1 | 10/2014 | Parker et al. |
| 2015/0366350 | A1* | 12/2015 | Di Censo ................ A47C 1/00 700/275 |
| 2016/0159251 | A1 | 6/2016 | Ebina et al. |

FOREIGN PATENT DOCUMENTS

| | | |
|---|---|---|
| JP | 2009241652 A | 10/2009 |
| TW | M508974 U | 9/2015 |
| WO | WO-03100741 A1 | 12/2003 |
| WO | WO 20150011866 | 1/2015 |

OTHER PUBLICATIONS

Search Report dated Jul. 7, 2017 for Great Britain Patent Application No. GB 1700442.5 (5 Pages).

* cited by examiner

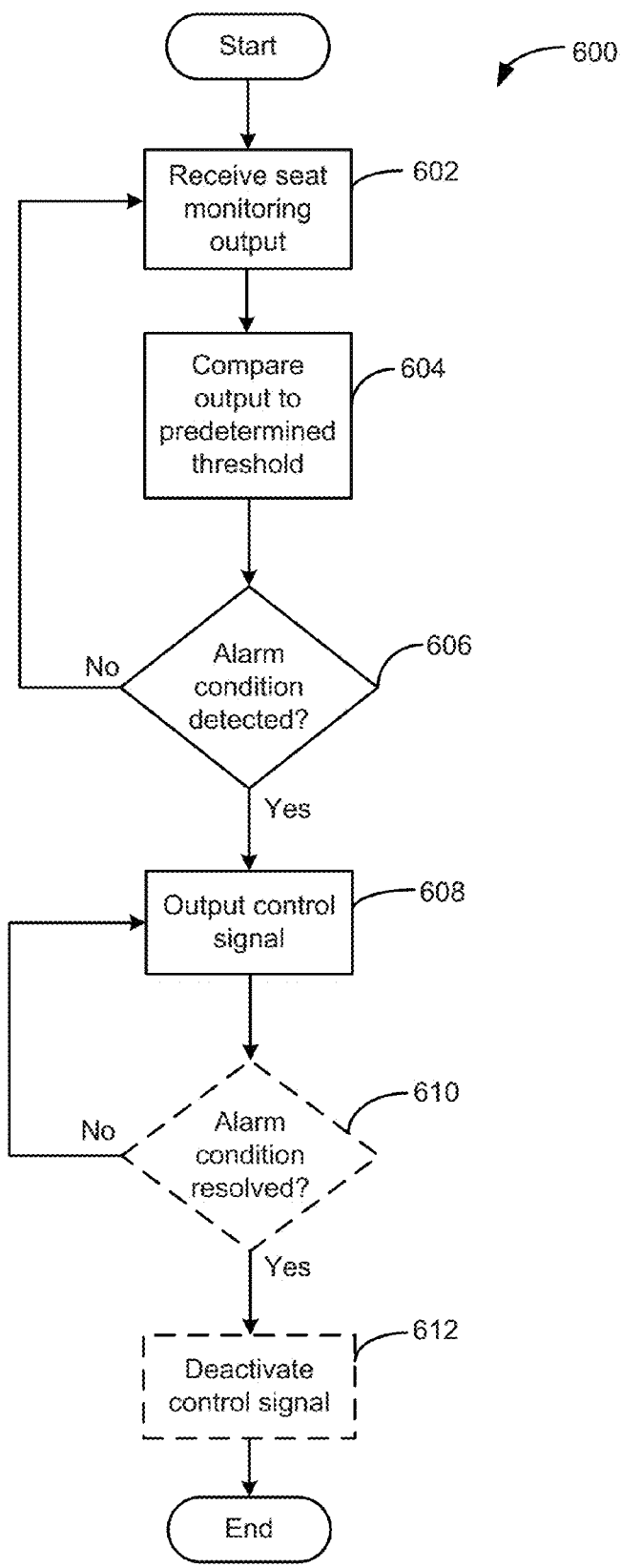

SYSTEM AND METHOD FOR VEHICLE SEAT MONITORING

TECHNICAL FIELD

This application generally relates to vehicle seats, and more specifically, to monitoring a position of the vehicle seat and a posture of an occupant of the vehicle seat.

BACKGROUND

Driving an automotive vehicle is a daily activity for many people and for some, includes long periods of time sitting in the vehicle seat. Poor sitting posture while driving a vehicle can produce a repetitive load that causes sustained stress. For example, poor posture can strain muscles and ligaments, making the driver more vulnerable to injury. Further, an improperly aligned spine can reduce the space between neighboring vertebrae, thus increasing the risk of compressed nerves. Remaining in a poor posture position over a long period of time can lead to musculoskeletal disorders, such as neck, shoulder, and back pain, and impact the health of other body systems (e.g., digestion, blood circulation, joints, etc.). On the other hand, the physical effort needed to sustain a proper sitting posture for an extended period of time can lead to muscle fatigue, as well as contribute to neck and back pain. Fitting a vehicle seat to the driver's body (e.g., a proper ergonomic setup), and otherwise selecting a proper seat position, can improve the driver's posture and help reduce pain, discomfort, and muscle fatigue, which also enhances the driver's effectiveness while driving the vehicle.

Many vehicles include one or more seat controls for adjusting a position of the driver's seat and, in some cases, one or more passenger seats. For example, the seat controls can allow adjustment of a headrest height, an angle of the seat back or backrest, a seat height, a seat length, an angle of the seat cushion, and/or lumbar support in the seat back. Proper seat position, or the appropriate settings for such seat controls, can vary from driver to driver depending on the person's body type (e.g., height and size). However, a number of general principles can help fit a seat to the driver's body.

For example, a seat height may be selected so that the driver's knees are bent at a 90 degree angle when the driver's feet are flat on the floor of the vehicle. Also, it is generally recommended that the knees not be higher than the driver's hips. However, taller drivers may need to elevate the front of the seat (e.g., by tilting it upwards) until the seat meets their knees. Conversely, for driving conditions that require high clutch use, the driver may need to lower the front of the seat (e.g., by tilting it downwards) to allow better access to the clutch. As another example, a lumbar support bladder, if present, may be properly positioned (e.g., filled) when it meets the driver's back and provides a firm yet comfortable level of support across the back. As an additional example, it is recommended that the seat be positioned with a slight recline in the driver's back, such as, an angle of 100 to 110 degrees between the back and the thighs, to help maintain proper posture while driving.

While existing seat controls enable the vehicle driver to select a more comfortable seat position, they are not capable of suggesting an ergonomically-appropriate seat position for the driver or otherwise providing feedback if an inadequate seat position is selected. Some existing vehicle systems monitor the posture of drivers or other vehicle occupants and provide a warning or audible alarm if poor posture is detected. However, these existing systems are not capable of identifying an improper seat position and providing alterations to the seat position to help improve the driver's posture and/or attain a proper seat position. Accordingly, there is still a need in the art for vehicle systems and methods that can monitor the seat position and posture of a vehicle occupant and correct an inadequate seat position and/or poor posture of the occupant.

SUMMARY

The invention is intended to solve the above-noted and other problems by providing systems and methods configured to (1) monitor a seat position and posture of a vehicle driver or other occupant using one or more sensors located in the vehicle seat and (2) upon detecting an improper seat position or poor posture condition, output a control signal for correcting the detected condition.

For example, one embodiment provides a vehicle comprising a seat, a first sensor coupled to the seat for detecting a seat angle, and a processor communicatively coupled to the first sensor and the seat, and configured to output a control signal for correcting the seat angle if the seat angle is not within a predetermined range of values. Another example embodiment includes a method of correcting a position of a vehicle seat having an occupant seated therein. The method comprises receiving, at a processor, an output detected by a sensor unit coupled to the seat; comparing, using the processor, the output to a predetermined threshold to determine whether an alarm condition exists; if it does, outputting a control signal for correcting the seat position, wherein the sensor unit includes an angular position sensor.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 6 is a flow diagram of an example method for monitoring and correcting seat position and occupant posture in a vehicle, in accordance with certain embodiments.

DETAILED DESCRIPTION OF EXAMPLE EMBODIMENTS

Figure 1:
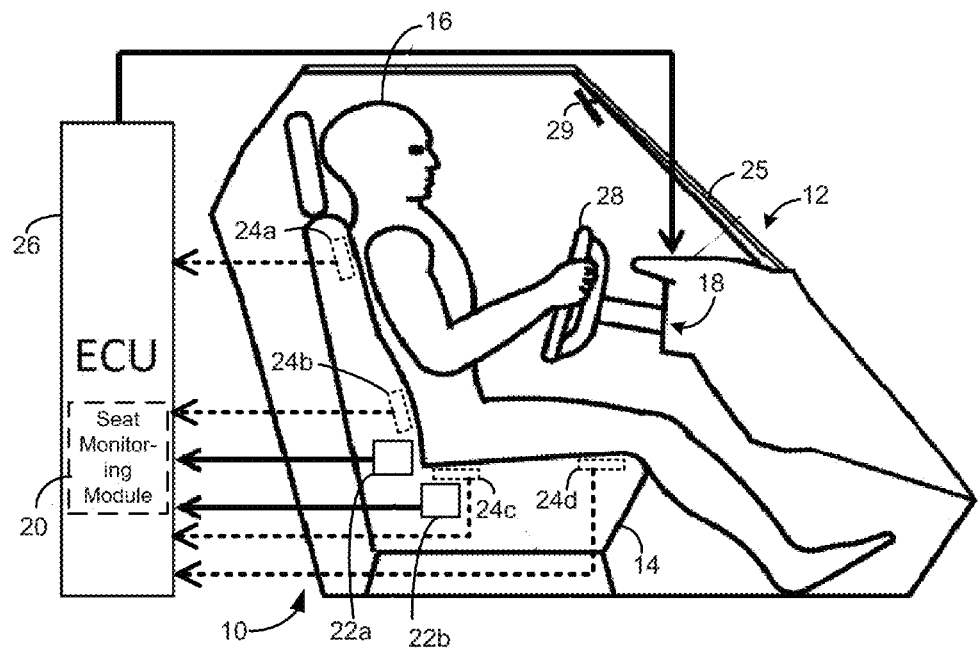
FIG. 1 is an illustration of an exemplary vehicle seat monitoring system coupled to an example vehicle in accordance with certain embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 illustrates an exemplary vehicle seat monitoring system 10 included in a vehicle 12, in accordance with embodiments. The seat monitoring system 10 is configured to monitor one of more aspects of a vehicle seat 14 occupied by a vehicle occupant 16 (such as, e.g., a vehicle driver) and to detect an alarm condition upon identifying an improper, or inadequate, seat position and/or poor posture in the occupant 16. The seat monitoring system 10 is further configured to output a control signal for correcting the seat position and/or occupant posture, or otherwise resolving the alarm condition. In some embodiments, the control signal causes the vehicle 12 to present, on a vehicle display 18, one or more notifications for alerting or warning the vehicle occupant 16 of the alarm condition and for suggesting a correction to the seat position and/or occupant posture to resolve the alarm condition. In other embodiments, the control signal causes the vehicle seat 14 to automatically correct the seat position such that the alarm condition is resolved. In still other embodiments, the control signal causes the vehicle 12 to restrict an action of the vehicle driver 16 (such as, e.g., placing the vehicle 12 in a drive gear) until the alarm condition is resolved. The seat monitoring system 10 can be communicatively coupled to a vehicle computing system (such as, e.g., vehicle computing system (VCS) 100 shown in FIG. 5) of the vehicle 12 in order to carry out these and other features of the invention. In embodiments, the components of the vehicle seat monitoring system 10 can communicate with each other and/or components of the vehicle computing system using wired or wireless connections. If communicating wirelessly, the vehicle seat monitoring system 10 may include a transmitter (not shown) for wirelessly transmitting output signals to other components.

In embodiments, the seat monitoring system 10 includes a seat monitoring module 20 communicatively coupled to one or more seat sensor(s) in order to determine a seat position and/or posture of the occupant 16. The one or more seat sensor(s) can include angular sensors 22 and/or contact sensors 24, as described in more detail below. As shown, an output of the one or more seat sensor(s) 22 and/or 24 can be provided to an electronic control unit (ECU) 26, or other electronic data processor, that is configured to execute the seat monitoring module 20, for example, using software instructions stored in the memory of the vehicle computing system or the seat monitoring system 10. According to embodiments, the ECU 26 may be included in the seat monitoring system 10 or in the vehicle computing system of the vehicle 12.

Various components of the seat monitoring system 10 can be included in the seat 14, another seat of the vehicle 12, the vehicle computing system of the vehicle 12, or other portion of the vehicle 12. For example, in embodiments the seat sensor(s) 22 and/or 24 can be included in, or integrated into, the seat 14, as shown in FIG. 1, and the seat monitoring module 20 can comprise program modules or software instructions stored in a data storage device (such as, e.g., data storage device 102 shown in FIG. 5) and executed by a data processor (such as, e.g., data processor 104 shown in FIG. 5) of the vehicle computing system, as described in more detail below. In other cases, the seat monitoring module 20 can be stored in and executed by the seat monitoring system 10.

Figure 2:
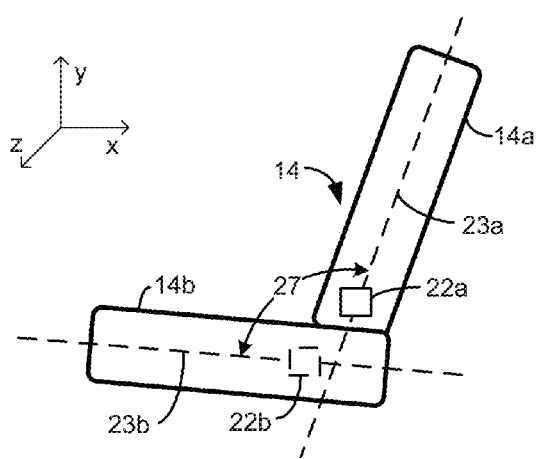
FIG. 2 is an illustration of an exemplary vehicle seat comprising one or more components of the vehicle seat monitoring system of FIG. 1 in accordance with certain embodiments.

As shown in FIGS. 1 and 2, the seat sensor(s) in the seat 14 include at least one angular sensor 22 (also referred to herein as "angular position sensor") for determining a seat angle 27 of the seat 14, or more specifically, an angular relation between a seat back 14a and a seat cushion 14b of the seat 14. As shown, the seat cushion 14b can be a generally flat and horizontal surface for the occupant 16 to sit upon, and the seat back 14a can be coupled to the seat cushion 14b to provide the occupant 16 with a generally flat and vertical surface to his back upon. In embodiments, the seat angle 27 can be adjusted by tilting the seat back 14a forward or backward, and/or by tilting the seat cushion 14b upwards or downwards. The seat angle 27 of the seat 14 can be utilized by the ECU 26 to determine whether a selected position of the seat 14 is proper or improper. In embodiments, proper seat position may be associated with a predetermined threshold value or range of values for the seat angle 27, and the ECU 26 can be configured to determine whether the detected seat angle 27 falls within the predetermined threshold value or range. For example, in a preferred embodiment, the seat position is proper when the seat angle 27 is within a range of 100 to 110 degrees, or other ergonomically appropriate threshold value(s).

In some embodiments, the at least one angular sensor 22 includes a first angular sensor 22a for determining an angle or tilt of the seat back 14a relative to a fixed axis, such as, for example, an x-axis, and a second angular sensor 22b for determining an angle or tilt of the seat cushion 14b relative to another fixed axis, such as, for example, a y-axis. The first angular sensor 22a may be positioned along, or parallel to, a rotational axis 23a of the seat back 14a, and the second angular sensor 22b may be positioned along, or parallel to, a rotational axis 23b of the seat cushion 14b. In such cases, the output values of each sensor 22a, 22b can be sent to the ECU 26 or other electronic data processor to calculate the angular relation between the seat back 14a and the seat cushion 14b.

In other embodiments, the at least one angular sensor 22 includes only the first angular sensor 22a for determining an angle of the seat back 14a relative to a predefined axis, such as, for example, the x-axis or an axis running parallel to the seat cushion 14b or the floor of the vehicle 12. In such cases, an angle of the seat cushion 14b may be fixed at a predetermined value, and the ECU 26 may use the fixed value and the output value of the first angular sensor 22a to calculate the angular relation between the seat back 14a and the seat cushion 14b.

The angular sensor(s) 22 may include any type of angular sensing technology, including, for example, a potentiometer, an encoder, a linear variable differential transformer (LVDT), or other sensor for measuring angular position. In some cases, the angular sensor(s) 22 can be configured to measure or detect the seat angle 27 and output the angle 28 to the ECU 26. For example, the angular sensor(s) 22 can be configured to directly measure the angle or tilt of the seat back 14a and/or the seat cushion 14b and output the measured angle 28. In other cases, raw values detected by the angular sensor(s) 22 can be provided to the ECU 26 for computing the angular relation or seat angle 27. For example, the seat angle 27 can be calculated by the ECU 26 by comparing a first output value received from the angular sensor 22a to a second output value received from the angular sensor 22b.

Figure 5:
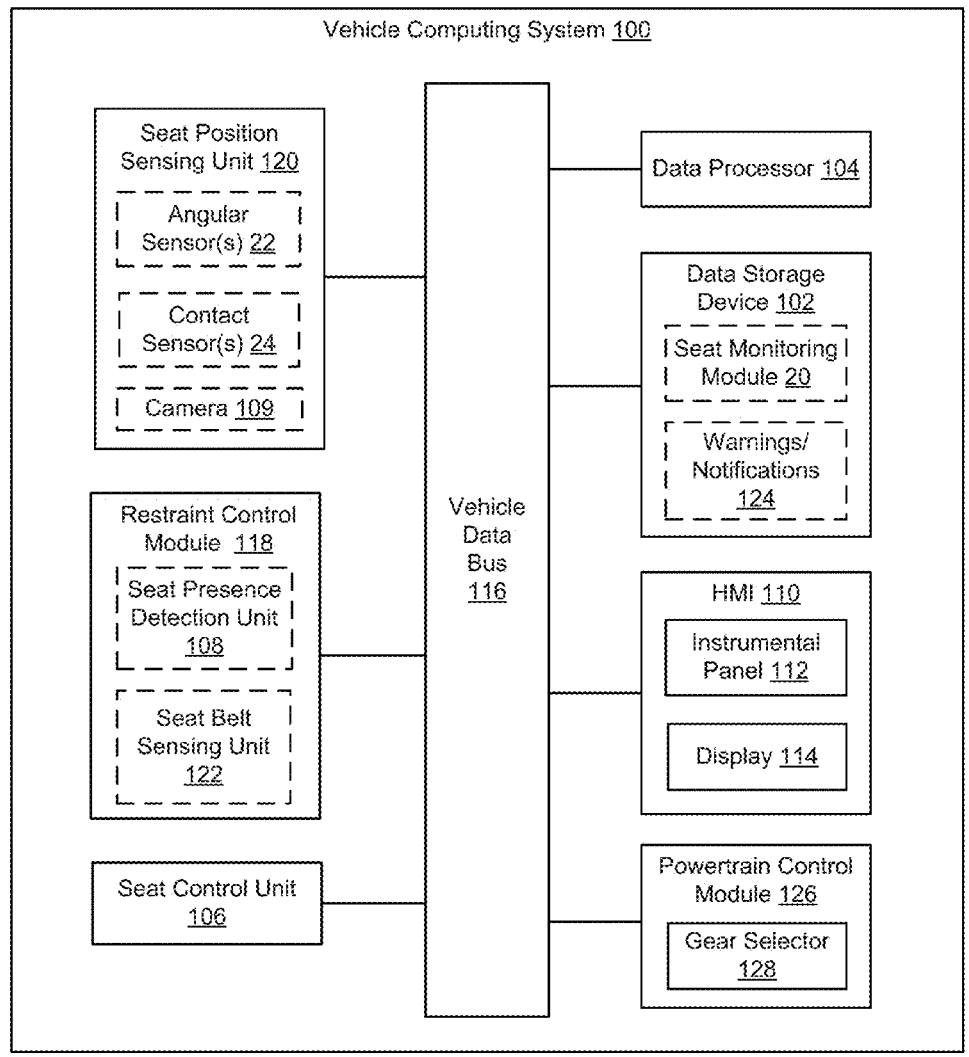
FIG. 5 is a block diagram showing an exemplary vehicle computing system comprising the vehicle seat monitoring system of FIG. 1, in accordance with certain embodiments.

In some embodiments, the angular sensor(s) 22 can be coupled to one or more seat position controls (such as, e.g., those included in seat control unit 116 shown in FIG. 5) and configured to determine an angle of the seat back 14a and/or the seat cushion 14b based on a seat position selected by the occupant 16. For example, the vehicle seat 14 and/or the seat control unit 116 may include a seat back adjustment control (not shown) and/or a seat cushion adjustment control (not shown) for enabling the occupant 16 to adjust the seat position. The settings selected for each of these controls can be used to generate an output for the angular sensor(s) 22. For example, if the seat back adjustment control is a knob, a turning direction (e.g., clockwise or counterclockwise) and a number of turns of the knob in each direction can be translated into the selected angle of the seat back 14a. As another example, if the seat cushion adjustment control includes a pair of buttons (e.g., an increase button and a decrease button), a number of depressions of each button can be translated into the selected angle of the seat cushion 14b. As will be appreciated, similar techniques may be used to determine the selected angle if one of the seat adjustment controls is a lever, a touchpad or other contact sensing technology, or any other type of input device.

Referring back to FIG. 1, in some embodiments, the seat sensor(s) also include one or more contact sensors 24 positioned at various locations on the seat 14 to detect contact between the occupant 16 and each seat location. In such embodiments, an output of the contact sensor(s) 24 can be utilized by the ECU 26 to determine whether the occupant 16 has good posture or poor posture. For example, good posture may be associated with the existence of proper contact between the occupant 16 and each of the contact sensor(s) 24.

According to some embodiments, the contact sensor(s) 24 can be located in the seat back 14a and configured to detect occupant contact with one or more locations of the seat back 14a, and/or located in the seat cushion 14b to detect occupant contact with one or more locations of the seat cushion 14b. For example, as shown in FIG. 1, the contact sensor(s) 24 can include at least one of a shoulder sensor 24a located adjacent to an expected location of a shoulder of the occupant 16, a lumbar support sensor 24b located adjacent to an expected location of a lumbar region of the occupant 16, a hip sensor 24c located adjacent to an expected location of a hip of the occupant 16, and a leg sensor 24d located adjacent to an expected location of a leg of the occupant 16, when the occupant 16 is seated in the seat 14.

The one or more contact sensor(s) 24 can include any type of sensor capable of detecting contact between the occupant 16 and the seat 14, including, for example, a proximity sensor, infrared sensor, pressure sensor, or other contact or presence sensing technology. Depending on the type of contact sensor technology used, an output of each contact sensor 24 may be one of a high value (e.g., "1") or a low value (e.g., "0"), or one of an "on" status or an "off" status, to indicate whether contact is detected. As an example, a low output value can indicate a lack of contact with the seat 14 and a high output value can indicate the existence of contact with the seat 14.

In embodiments, the contact sensor(s) 24 can be configured such that the occupant 16 has proper or good posture when the occupant's body is in contact with each of the contact(s) 24. For example, the contact sensor(s) 24 can be placed at predetermined seat locations that indicate a good posture of the vehicle occupant 16 when there is occupant contact with said locations. In other cases, the contact sensor(s) 24 can be placed at predetermined seat locations that indicate poor or improper posture when there is a lack of occupant contact with said locations. In either case, contact may be broken with the shoulder sensor 24a if the occupant 16 leans forward while sitting in the seat 14 due to slouching or slumping in the shoulders, curling forward the back or torso, or otherwise tilting the body towards a steering wheel 28 of the vehicle 12. Likewise, contact may be broken with the lumbar sensor 24b if, for example, the occupant 16 arches his back forward or otherwise tilts his body towards the steering wheel 28. Contact may be broken with the hip sensor 24c if the occupant 16 is seating too far forward in the seat 14, for example, in a front half of the seat 14. Likewise, contact may be broke with the leg sensor 24d if, for example, the knees of the occupant 16 are too high above the seat 14.

In some embodiments, the vehicle seat 14 and/or the seat monitoring system 10 further includes a presence detector (such as, e.g., seat presence detection unit 108 shown in FIG. 5) to determine whether the occupant 16 is sitting in the seat 14 before activating the contact sensor(s) 24. In a preferred embodiment, the presence detector may be integrated into the seat cushion 14b. An output of the presence detector can be provided to the ECU 26 and depending on whether the output value is high (e.g., presence is detected) or low (e.g., presence is not detected), the ECU 26 may activate or deactivate the contact sensor(s) 24, respectively. The presence detector can include any suitable presence detection device, such as, for example, a pressure sensor, weight sensor, proximity sensor, or infrared sensor.

In some embodiments, the vehicle 12 and/or the seat monitoring system 10 includes an in-vehicle camera (such as, e.g., camera 109 shown in FIG. 5) for scanning the occupant 16 and/or the seat 14 and obtaining occupant posture and seat position information therefrom. The camera can be positioned to face a front and/or side of the seat 14 so that both a posture of the occupant 16 and a position of the seat 14 are fully visible. Images captured by the camera can be transmitted to the seat monitoring module 20 to process the images and extract seat position and posture status information therefrom, using known techniques. For example, the capture images can be compared to pre-stored images showing proper and/or improper seat position and poor and/or good posture, in order to determine whether an alarm condition exists. The camera can include any suitable type of camera including, for example, a Kinect camera, a dash camera, a rear view camera, an infrared camera, a monochrome CCD camera, or a color CCD camera.

While FIG. 1 shows the vehicle occupant 16 sitting in a driver's seat of the vehicle 12, it will be appreciated that the vehicle seat monitoring system 10 can be utilized to check the posture and seat position in other seats (not shown) of the vehicle 12, including the front passenger seat or one or more of the rear seats. Further, while the sensors 22 and 24 are shown on only one side of the seat 14 in FIG. 1, it will be appreciated that, in some embodiments, additional sensors 24 may be positioned on an opposing side of the seat 14 at mirrored seat locations, in order to ensure proper occupant contact across the seat 14. Alternatively, the sensors 24 can be positioned centrally on the seat 14, so as to accurately detect contact using only one sensor 24 at each seat location.

In embodiments, the ECU 26 and/or the seat monitoring module 20 can be configured to determine whether an alarm condition exists based on the outputs received from the one or more seat sensors 22, 24. For example, in some cases, an alarm condition may be detected if the seat 14 is in an improper position (e.g., the seat angle 27 is less than or greater than the predetermined threshold range of 100 to 115 degrees) or if the occupant 16 is sitting with poor posture (e.g., the occupant 16 is not in contact with each of the contact sensor(s) 24). If an alarm condition is detected, the ECU 26 and/or the seat monitoring module 20 can be configured to generate a control signal for correcting the detected seat position and/or occupant posture, so as to resolve or deactivate the alarm condition.

In some embodiments, the control signal causes the vehicle seat 14 to automatically adjust the detected seat position until the alarm condition is resolved, or the seat position and/or occupant posture is corrected. In such embodiments, the control signal may include a suggested angle adjustment for at least one of the seat back 14a and the seat cushion 14b, and upon receiving the control signal, the corresponding component of the vehicle seat 14 may automatically move, or adjust its tilt, until the seat angle 27 has been adjusted by the suggested amount or is otherwise within the predetermined threshold range. For example, the seat back 14a may be tilted forwards or backwards to meet the suggested angle adjustment, and/or the seat cushion 14b may be titled upwards or downwards to meet he suggest angle adjustment. The control signal for automatic angle adjustment may be sent to a seat control unit of the vehicle 12 (such as, e.g., seat control unit 106 shown in FIG. 5) in order to implement automatic control of the vehicle seat 14.

In other embodiments, the control signal causes the vehicle 12 to restrict an action or function of the vehicle 12 until the alarm condition is resolved. For example, the control signal may prevent the vehicle driver 16 from changing a gear of the vehicle 12 if the detected seat position and/or occupant posture is not proper. For example, if the vehicle 12 is in park when the alarm condition is triggered, the control signal may prevent the driver 16 from changing the gear selector to "drive," "reverse," or any other active gear. In such cases, the control signal may be sent to a gear selector (such as, e.g., gear selector 128 shown in FIG. 5) for selecting a gear of the vehicle. Upon receiving the control signal, the gear selector may be deactivated until the alarm condition is resolved. In such embodiments, a second control signal may be sent to re-activate the gear selector once the seat position and/or occupant posture is corrected.

In some embodiments, in addition to, or instead of, an automatic adjustment of the vehicle seat 14 or an automatic restriction of the vehicle 12, the control signal can include one or more notifications for alerting the vehicle occupant 16 of the alarm condition and for suggesting a correction to the detected seat position and/or occupant posture to resolve or deactivate the alarm condition. The ECU 26 and/or the seat monitoring module 20 can be configured to send the notification to the vehicle display 18 in order to present the notification to the vehicle occupant 16. In embodiments, the vehicle display 18 can be any display screen included in a human machine interface (such as, e.g., human machine interface (HMI) 110 shown in FIG. 5) of the vehicle 12 or other vehicle unit capable of displaying information (such as, e.g., a rearview mirror 29 for enabling a driver to look behind the vehicle 12, a front windshield 25 of the vehicle 12, etc.). For example, as shown in FIG. 1, the vehicle display 18 may be included in a dashboard or instrument panel (such as, e.g., instrument panel 112 shown in FIG. 5) of the vehicle 12. In other cases, the vehicle display 18 may be included in a separate media display screen (such as, e.g., display 114 shown in FIG. 5) for displaying vehicle infotainment information, such as, for example, navigation system information, audio system information, etc. In still other cases, the vehicle display 18 may be on a display screen of a mobile device (not shown) paired to the vehicle 12, or more specifically, to a vehicle computing system therein (such as, e.g., vehicle computing system (VCS) 100 shown in FIG. 5), for displaying vehicle infotainment information.

The one or more notifications may comprise graphical icon(s), pictorial image(s), textual message(s), audible sound(s), light-based alert(s), or any combination thereof. For example, in some cases, the notification may include a textual description explaining the alarm condition and/or the recommended correction for resolving the condition. In other cases, the notification may include an image showing the cause for the alarm condition and/or how the seat position and/or posture can be corrected.

In some embodiments, the vehicle seat monitoring system 10 generates a different notification for each type of alarm condition. For example, the system 10 may generate a poor posture notification (such as, e.g., poor posture notification 30 shown in FIG. 3) upon determining that the occupant 16 is sitting in a poor posture position, and may generate an improper seat position notification (such as, e.g., improper seat position notification 40 shown in FIG. 4A) upon determining that the seat 14 is in an improper position. In cases where the alarm condition requires both types of notifications (e.g., poor posture and improper seat position are detected), the notifications may be displayed simultaneously or in succession.

Figure 3:
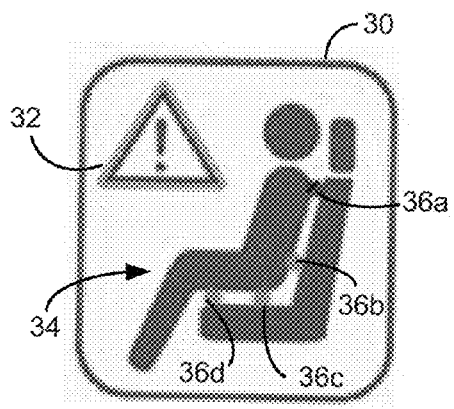
FIG. 3 is an illustration of an exemplary notification generated by the vehicle seat monitoring system of FIG. 1 in accordance with certain embodiments.

In other embodiments, the system 10 may generate the notification in two parts: a first notification portion common to every type of alarm condition (such as, e.g., warning symbol 32 shown in FIG. 3) and a second notification portion specific to the type(s) of alarm condition (such as, e.g., occupant image 34 shown in FIG. 3). In the latter case, the same notification can be used to inform the vehicle occupant 16 of more than one alarm condition (e.g., poor posture and improper seat position).

Referring now to FIG. 3, shown is an exemplary poor posture notification 30 generated by the vehicle seat monitoring system 10 and presented on the vehicle display 18 upon detecting a poor posture of the vehicle occupant 16, in accordance with embodiments. As illustrated, the notification 30 can include a warning symbol 32 designed to grab the vehicle occupant's attention and inform the occupant 16 of the alarm condition. In addition, the notification 30 can include an occupant image 34 configured to inform the occupant 16 of the cause for the alarm condition. As will be appreciated, the illustrated notification 30 is merely exemplary and other symbols and/or images may be used to perform the same or similar function.

In the illustrated embodiment, the occupant image 34 depicts a person seated in a vehicle seat and four points of contact 36 between the person and the seat. These contact points 36 can correspond to a respective one of the contact sensor(s) 24. For example, in FIG. 3, contact point 36a corresponds to the shoulder sensor 24a, contact point 36b corresponds to the lumbar sensor 24*b*, contact point 36*c* corresponds to the hip sensor 24*c* and contact point 36*d* corresponds to the leg sensor 24*d*. The notification 30 can also indicate which of the contact sensor(s) 24, if any, lacks contact with the occupant 16 by highlighting the corresponding contact point 36 within the occupant image 34. For example, in FIG. 3, the contact point 36*a* is highlighted by drawing an "X" through the contact point 36*a*, thereby indicating that the shoulder sensor 24*a* does not detect occupant contact. Other techniques for highlighting the non-detecting contact points 36 may be used, including displaying the non-detecting contact points 36 in different shapes or colors (e.g., red if no contact is detected and green if contact is detected), displaying only the contact point(s) 36 that lack contact, or displaying only the contact point(s) 36 that have detected contact.

In the illustrated embodiment, the highlighted contact point 36*a* serves two functions: to indicate the cause of the alarm condition and to recommend a correction for resolving the alarm condition (e.g., a recommended posture adjustment). In other embodiments, the notification 30 may include textual message(s), in addition to or instead of the highlighted contact point(s), to explain the cause of the alarm condition (e.g., "no seat contact detected at the shoulder") and/or to explain the recommended correction (e.g., "sit back in seat" or "touch shoulders to seat").

Figure 4A:
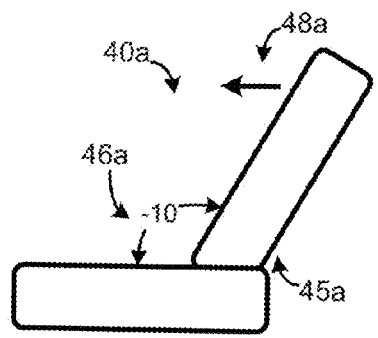
FIGS. 4A to 4C are illustrations of additional exemplary notifications generated by the vehicle seat monitoring system of FIG. 1 in accordance with certain embodiments.
Figure 4B:
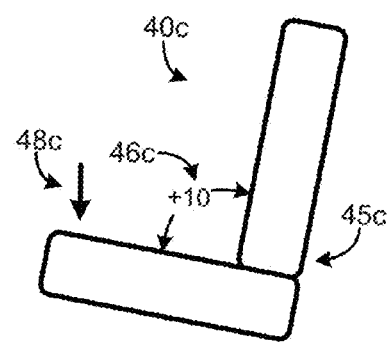
Figure 4C:
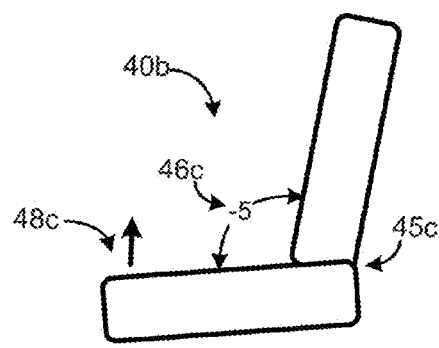

Referring now to FIGS. 4A, 4B, and 4C, shown are exemplary improper seat position notifications 40 generated by the vehicle seat monitoring system 10 and presented on the vehicle display 18 upon detecting an improper position of the seat 14, in accordance with embodiments. The notification 40 is configured to inform the occupant 16 of the reason for triggering the alarm condition, as well as how the condition can be removed or resolved (e.g., a recommended seat adjustment or seat angle adjustment). As shown, the notification 40 can include a seat image 45 to graphically illustrate a current position of the vehicle seat 14, or more specifically, a current amount of recline in the seat 14. As also shown, in some cases, the notification 40 can further include a recommended angle change 46 to numerically present a difference between the current seat angle 27 and a closest end of the predetermined threshold range (e.g., 100 to 110 degrees) for the seat angle, or more specifically, by how much the current seat angle 27 needs to be adjusted, and in which direction (e.g., increased or decreased) to remove the alarm condition. In addition, the notification 40 can include a recommended seat position adjustment 48 for correcting the current seat position, or more specifically, an arrow indicating a direction in which the seat back 14*a* can be moved to reach a proper seat position. In embodiments, the recommended seat position adjustment 48 and the recommended angle change 46 are combined to form a recommended seat angle adjustment for correcting or resolving the alarm condition.

For example, in FIG. 4A, a notification 40*a* includes a seat image 45*a* showing the seat back 14*a* as being reclined too far back, a recommended angle change 46*a* indicating that the need to decrease the seat angle 27 by 10 degrees in order to fall within the predetermined threshold range, and a recommended seat position adjustment 48*a* directing the vehicle occupant 16 to angle or tilt the seat back 14*a* forward. That is, the notification 40*a* tells the occupant 16 that the improper seat position can be corrected by reducing the angle in the seat back 14*a* by 10 degrees.

Likewise, in FIG. 4B, a notification 40*b* includes a seat image 45*b* that shows the seat angle 27 of the seat 14 as needing more recline, a recommended angle change 46*b* that indicates the need to increase the seat angle 27 by 10 degrees in order to fall within the predetermined threshold range, and a recommended seat position adjustment 48*b* that directs the occupant 16 to angle or tilt the seat cushion 14*b* down. That is, the notification 40*b* tells the occupant 16 that the improper seat position can be corrected by increasing the angle in the seat cushion 14*b* by 10 degrees.

In FIG. 4C, a notification 40*c* includes a seat image 45*c* that shows the seat angle 27 of the seat 14 as being too large, a recommended angle change 46*c* that indicates the need to decrease the seat angle 27 by 5 degrees in order to fall within the predetermined threshold range, and a recommended seat position adjustment 48*c* that directs the occupant 16 to angle or tilt the seat cushion 14*b* up. That is, the notification 40*c* tells the occupant 16 that the improper seat position can be corrected by decreasing the angle in the seat cushion 14*b* by 5 degrees.

Other types of notifications 40 are also contemplated for indicating improper seat position in accordance with the principles disclosed herein. For example, while the warning icon 32 is only shown in FIG. 3, it will be appreciated that notifications shown in FIGS. 4A, 4B, and 4C, may be presented in a format similar to that of the notification 30, including the warning icon 32. Further, in some cases, the notification 30 and 40 may be combined into one notification for indicating more poor posture and improper seat position. For example, the notification 30 may be revised by replacing the seat portion of the occupant image 34 with one of the seat images 45*a*, 45*b*, or 45*c* shown in FIG. 4A, 4B, or 4C and adding in the recommended change value 46 and the recommended seat position adjustment 48.

Referring now to FIG. 5, shown is example vehicle computing system (VCS) 100 that may be included in the vehicle 12, for example, as part of a vehicle electronics system or an infotainment system of the vehicle 12, in accordance with embodiments. The VCS 100 may be an infotainment system such as the SYNC® system manufactured by FORD MOTOR COMPANY®. Other embodiments of the VCS 100 can include different, fewer, or additional components than those described below and shown in FIG. 5.

As illustrated, the VCS 100 can include data storage device 102, data processor 104 (e.g., an electronic data processor), and a vehicle data bus 116. The VCS 100 can further include various electronic control units (ECUs) that responsible for monitoring and controlling the electrical systems or subsystems of the vehicle 12. Each ECU may include, for example, one or more inputs and outputs for gathering, receiving, and/or transmitting data, a memory for storing the data, and a processor for processing the data and/or generating new information based thereon. In the illustrated embodiment, the ECUs of the VCS 100 include seat control unit 106, human-machine interface (HMI) 110, a restraint control module (RCM) 118, a seat sensing unit 120, and a powertrain control module (PCM) 126.

Though not shown, the VCS 100 may include other ECUs, such as, for example, a telematics control unit (TCU) for enabling the vehicle 12 to connect to one or more wireless networks and a body control module (BCM) for controlling and monitoring various electronic accessories in a body of the vehicle 12. In some embodiments, the vehicle computing system 100 further includes a timer (not shown) for monitoring a timing of each notification presented on the vehicle display 18 and for notifying the seat monitoring module 20 if a predetermined amount of time has passed after the notification presentation, as described in more detail below.

The ECUs of the VCS 100 are interconnected by the vehicle data bus 116 (such as, e.g., a controller area network (CAN) bus), which passes data to and from the various ECUs, as well as other vehicle and/or auxiliary components (e.g., the seat sensors 22 and 24, the ECU 26, etc.) in communication with the VCS 100. Further, the data processor 104 can communicate with any one of the ECUs and the data storage device 102 via the data bus 116 in order to carry out one or more functions, including the functions associated with the seat monitoring module 20.

The seat control unit 106 can be an ECU for controlling electronically-powered seats of the vehicle 12, such as, for example, the seat 14. The seat control unit 106 can include one or more controls (not shown) for adjusting various aspects of the seat, including seat height, seat back angle, seat cushion angle, lumbar support, headrest height, etc. In some cases, the seat control unit 106 is included in the body control module (BCM). In embodiments, the seat control unit 106 can receive a control signal, from the data processor 104 and/or the seat monitoring module 20, for automatically correcting an angle of the vehicle seat 14, or more specifically, the seat back 14a and/or the seat cushion 14b, if the detected seat angle is not within the predetermined threshold.

The seat sensing unit 120 can be an ECU for determining the posture of the occupant 16 and/or the position of the seat 14 in the vehicle 12. In some embodiments, the seat sensing unit 120 can include the angular sensors 22, the contact sensors 24, and/or the camera 109, as shown in FIG. 5, but may be located in a cabin of the vehicle 12 and/or the seat 14 in order to detect the seat position and/or occupant posture. In other embodiments, the seat sensing unit 120 is communicatively coupled to the angular sensors 22, the contact sensors 24, and/or the camera 109 but is located in the VCS 100. In some embodiments, the seat sensing unit 120 may comprise the ECU 26. In such cases, the seat sensing unit 120 may also include the seat monitoring module 20. In other cases, the seat monitoring module 20 is stored in the data storage device 102 of the VCS 100, as shown in FIG. 5, and is executed by the data processor 104.

The human-machine interface (HMI) 110 (also referred to as a "user interface") can be an ECU for enabling user interaction with the vehicle 12 and for presenting vehicle information to the vehicle operator or driver. The HMI 110 comprises instrument panel (IP) 112 of the vehicle 12, media display screen 114, as well as one or more input devices (not shown) and/or output devices (not shown) for inputting, entering, receiving, capturing, displaying, or outputting data associated with the vehicle computing system 100, the seat monitoring module 20, or the techniques disclosed herein. The HMI 110 can be configured to interact with the other ECUs of the VCS 100 and/or the data processor 104 via the data bus 116 in order to provide information or inputs received via the HMI 110 to an appropriate component of the VCS 100 and to present, to the vehicle operator or occupant 16, information or outputs received from the various components of the VCS 100.

In embodiments, the instrument panel 112 (also referred to as a "dashboard" or "cluster") includes a control panel positioned in front of the driver's seat for housing instrumentation and controls for operation of the vehicle 12, including the steering wheel 28 and various gauges (e.g., speedometer, odometer, fuel gauge, etc.), and various vehicle indicators, such as, for example, a selected position of a gear selector, seat belt warnings or notifications, low fuel, low tire pressure, etc. In some cases, the instrument panel 112 includes a display screen for electronically or digitally displaying the various gauges, or values related thereto, and the various vehicle indicators.

The HMI 110 also includes media display screen 114 separate from the instrument panel 112 for displaying other vehicle information, such as, for example, navigation system information, audio system information, video captured by an external vehicle camera (not shown), image(s) captured by the in-vehicle camera 109, heating and air/conditioning information, etc. In embodiments, the VCS 100 may communicate notifications generated by the seat monitoring module 20 to the vehicle occupant 16 via the display 114, or via the instrument panel 112, for example, by displaying the notification icons 30 and/or 40 as one of the vehicle indicators.

The restraint control module (RCM) 118 can be an ECU for controlling and monitoring a restraint system (not shown) of the vehicle 12. For example, the RCM 118 can include a seat belt sensing unit 122 for determining whether a seat belt (not shown) coupled to the seat 14, or other vehicle seat, is fastened. In some embodiments, the RCM 118 further includes seat presence detection unit 108 for detecting the presence of an occupant in each vehicle seat. In such instances, the seat belt sensing unit 122 may be activated once occupant presence is detected in a vehicle seat. In some embodiments, an output of either the seat presence detection unit 108 or the seat belt sensing unit 122 can be used to activate the seat monitoring system 10. For example, when an occupant is detected in the seat 14 and/or a seat belt is buckled in the seat 14, the VCS 100 may provide this information to the seat monitoring system 10. Upon receiving this information, the seat monitoring module 20 may direct the contact sensors 24 to begin detecting the posture of the occupant and/or the angular sensors 22 to begin detecting the seat angle 27.

The data processor 104 can comprise one or more of a microprocessor, a microcontroller, a programmable logic array, an application-specific integrated circuit, a logic device, or other electronic device for processing, inputting, outputting, manipulating, storing, or retrieving data. In embodiments, the VCS 100 can comprise a general purpose computer that is programmed with various programming instructions or modules stored in the data storage device 102 (e.g., electronic memory), or elsewhere.

The data storage device 102 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. The data storage device 102 stores one or more software program modules or software instructions, including the vehicle seat monitoring module 20, for execution by the data processor 104. In some cases, the data storage device 102 also stores graphical icons, pictorial images, textual messages, or other warning items 124 used to generate notifications for alerting the vehicle driver or occupant 16 to an alarm condition, including the notifications 30 and/or 40 shown in FIGS. 3 and 4A-4C.

The powertrain control module (PCM) 126 can be an ECU for controlling and monitoring the engine and transmission of the vehicle 12. In some embodiments, the PCM 126 can be separated into two separate ECUs, specifically an engine control unit and a transmission control unit. In either case, the PCM 126 can be configured to control starting and stopping of the engine of the vehicle 12. As shown in FIG. 5, the PCM 126 can include, or be coupled to, a gear selector (also known as a "gearshift") 128 for changing a gear of the vehicle 12 between, for example, park ("P"), reverse ("R"), neutral ("N"), drive ("D"), and low gear ("L"). The PCM 126 can be configured to deactivate the gear selector 128 upon receiving a control signal from the seat monitoring module 20 and/or the data processor 104 once an alarm condition is detected, so as to prevent the driver 16 from moving the vehicle 12 out of "park" until the alarm condition is resolved. The PCM 126 may reactivate the gear selector 128 once the alarm condition is resolved.

FIG. 6 illustrates an example method 600 for monitoring and correcting a position of a vehicle seat (such as, e.g., the seat 14 in the vehicle 12, as shown in FIGS. 1 and 2) having an occupant (such as, e.g., the occupant 16 shown in FIG. 1) seated therein, in accordance with embodiments. The method 600 can be carried out by one or more processors (or controllers) included in, for example, a vehicle seat monitoring system (such as, e.g., the vehicle seat monitoring system 10 shown in FIG. 1) and/or a vehicle computing system (such as, e.g., the vehicle computing system 100 shown in FIG. 5). In one embodiment, the method 600 is implemented, at least in part, by the data processor 104 of the VCS 100 executing software stored in the data storage device 102, such as, e.g., the seat monitoring module 20, and interacting with one or more components of the VCS 100 and/or the vehicle seat monitoring system 10 coupled thereto.

The method 600 can begin at step 602, where the processor and/or the seat monitoring module receives an output from one or more sensors included in, or coupled to, a vehicle seat (such as, e.g., the sensors 22 and/or 24 included in the vehicle seat 14, as shown in FIG. 1). In some cases, the output may be received via an electronic control unit (such as, e.g., the ECU 26 shown in FIG. 1), or other electronic data processor of the vehicle seat monitoring system 10, that is coupled to the one or more sensors.

In embodiments, the output includes a seat angle (such as, e.g., the seat angle 27 shown in FIG. 2) detected by, for example, an angular position sensor (such as, e.g., the angular sensor(s) 22 shown in FIGS. 1 and 2) coupled to the seat and included in the one or more sensors. In some cases, the seat angle is an angular relation between a seat back (such as, e.g., the seat back 14a shown in FIGS. 1 and 2) and a seat cushion (such as, e.g., the seat cushion 14b shown in FIGS. 1 and 2) of the vehicle seat, and is calculated by the processor. For example, the processor may calculate the seat angle based on a first angle detected by an angular position sensor located in the seat back (such as, e.g., the angular sensor 22a shown in FIGS. 1 and 2) and a second angle detected by an angular position sensor located in the seat cushion (such as, e.g., the angular sensor 22b shown in FIGS. 1 and 2). In other cases, the seat angle is an angle of the seat back, the angle of the seat cushion being fixed.

In some embodiments, the output can also include an occupant contact status detected by, for example, a contact sensor (such as, e.g., the sensor(s) 24 shown in FIG. 1) positioned at a seat location and included in the one or more sensors. The contact sensor can be configured to detect contact between the seat location and the occupant seated therein. The occupant contact status may be positive if occupant contact is detected at the seat location by the contact sensor, and may be negative if occupant contact is not detected at the seat location. In embodiments, the one or more sensors includes a plurality of contact sensors (such as, e.g., shoulder sensor 24a, back sensor 24b, hip sensor 24c, and leg sensor 24d shown in FIG. 1) located at various seat locations, and occupant contact with all of the contact sensors indicates good posture, while a lack of occupant contact with at least one of the contact sensors indicates poor posture.

The method 600 further includes step 604, where the processor and/or the seat monitoring module compares the output received at step 602 to a predetermined threshold. The predetermined threshold can vary depending on the type of output. For example, when the output is from the angular position sensor, the predetermined threshold is a range of values representing a range of ergonomically-recommended seat angles for the vehicle seat, such as, e.g., approximately 100 to 110 degrees. When the output is from the contact sensor, the predetermined threshold is a positive occupant contact status, or an output value indicating that contact has been detected between vehicle seat and occupant (e.g., "high" or "1").

At step 606, the processor and/or the seat monitoring module determines whether an alarm condition exists based on the output compared at step 604. An alarm condition is detected if the output (or detected seat angle) of the angular sensors is not within (e.g., greater than or lower than) the predetermined threshold or range of values. Also, the alarm condition can be detected if the output of the contact sensors is a negative occupant contact status indicating that one or more contact sensors do not detect contact between the vehicle seat and the occupant. If an alarm condition is not detected (e.g., an answer of "no" at step 606), the method 600 goes back to step 602 to wait for a new output from the one or more seat sensors.

If, on the other hand, an alarm condition is detected (e.g., an answer of "yes" at step 606), the method 600 continues to step 608, where the processor and/or seat monitoring module outputs a control signal for correcting the seat position and/or occupant posture that triggered the alarm condition. In some embodiments, the control signal is provided to a seat control unit (such as, e.g., the seat control unit 106 shown in FIG. 5) of the vehicle computing system in order to cause an automatic adjustment of an angle of the vehicle seat, or more specifically, the angular relation between the seat back and the seat cushion. For example, the control signal may include a suggested angle adjustment (e.g., a number of degrees) and upon receiving the control signal, the seat control unit may automatically adjust at least one of an angle of the seat back and an angle of the seat cushion in order to achieve the suggested angle adjustment. In other embodiments, the control signal is provided to a gear selector of the vehicle (such as, e.g., gear selector 128 shown in FIG. 5) in order to restrict gear changing until the alarm condition is resolved. In such cases, the control signal may be provided while the gear selector is in "park" and may deactivate the gear selector (e.g., prevent shifting of the gear into "drive" or "reverse") until the alarm condition is resolved.

In some embodiments, the control signal causes a vehicle display (such as, e.g., the vehicle display 18 shown in FIG. 1) to display a warning or notification (such as, e.g., the notifications 30 and/or 40 shown in FIGS. 3 and 4A-4C). The notification comprises a recommended seat adjustment for adjusting the seat position or seat angle and can include a graphical depiction of the recommended seat adjustment, for example, as shown in FIGS. 4A-4C. In some cases, the notification also includes a recommended posture adjustment for adjusting a posture of the occupant and can include a graphical depiction of the seat location where occupant contact is not detected. In embodiments, the notification, or more specifically, the icons, images and/or text included therein, may be stored in a data storage device (such as, e.g., the data storage device 102 shown in FIG. 5). In such cases, the processor and/or seat monitoring module may retrieve the notification or the components thereof (such as, e.g., the warnings/notifications 124 shown in FIG. 5) from the data storage device and provide the same to the vehicle display for display to the vehicle operator.

In some embodiments, the method 600 further includes step 610, where the processor and/or the seat monitoring module determine whether the alarm condition has been resolved through sufficient correction of the seat position and/or the occupant posture, as needed. For example, the process and/or the seat monitoring module may receive a new output from the seat sensors if the vehicle occupant corrects his posture by coming into contact with all of the contact sensors and/or the vehicle seat position is corrected by adjusting an angle or title of the vehicle seat to within the predetermined threshold range.

If the alarm condition is resolved (e.g., an answer of "yes" at step 610), the method 600 may continue to step 612, where the notification is deactivated or no longer displayed on the vehicle display. If, on the other hand, a correction is not received (e.g., an answer of "no" at step 610), the method 600 may go back to step 608 to output the control signal again. In some embodiments, this loop may continue until a correction is made, or the alarm condition is resolved. In some embodiments, the vehicle occupant or driver can selectively deactivate the warning. In other embodiments, the method 600 does not include step 610 and the notification is displayed for a set period of time (X) (e.g., 20 seconds) before being automatically deactivated at step 612. The method 600 may end after step 612, if included, or otherwise, after step 608.

In certain embodiments, the process descriptions or blocks in the figures, such as FIG. 6, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle comprising:
a seat;
a first sensor coupled to the seat for detecting a seat angle;
a processor communicatively coupled to the first sensor and the seat, and configured to output a control signal for correcting the seat angle if the seat angle is not within a predetermined range of values; and
a gear selector communicatively coupled to the processor, wherein the control signal deactivates the gear selector.

2. The vehicle of claim 1, wherein the predetermined range of values is approximately 100 to 110 degrees.

3. The vehicle of claim 1, wherein the seat includes a seat back and a seat cushion, and the seat angle is an angular relation between the seat back and the seat cushion.

4. The vehicle of claim 3, wherein the first sensor is coupled to the seat back and configured to detect an angle of the seat back.

5. The vehicle of claim 4, further comprising a second sensor, the second sensor being coupled to the seat cushion and being configured to detect an angle of the seat cushion, wherein the processor is further configured to calculate the seat angle based on the angle detected by the first sensor and the angle detected by the second sensor.

6. The vehicle of claim 1, further comprising a display communicatively coupled to the processor, wherein the control signal causes the display to present a notification comprising a recommended seat angle adjustment for adjusting the seat angle to within the predetermined range of values.

7. The vehicle of claim 6, wherein the notification graphically depicts the recommended seat angle adjustment.

8. The vehicle of claim 6, further comprising a contact sensor coupled to the seat for detecting an occupant contact with the seat, wherein the control signal causes the display to present a second notification if the occupant contact is not detected at a seat location.

9. The vehicle of claim 8, wherein the notification graphically depicts the seat location where the occupant contact is not detected.

10. The vehicle of claim 1, wherein the control signal causes the seat to automatically adjust the seat angle to within the predetermined range of values.

11. The vehicle of claim 1, wherein the processor reactivates the gear selector once the seat angle is within the predetermined range of values.

12. A method of correcting a position of a vehicle seat having an occupant seated therein comprising:
receiving, at a processor, an output detected by a sensor unit coupled to the seat;
comparing, using the processor, the output to a predetermined threshold to determine whether an alarm condition exists; and
if it does, outputting a control signal for correcting the seat position, wherein:
the sensor unit includes an angular position sensor; and
outputting the control signal comprises deactivating a gear selector of a vehicle.

13. The method of claim 12, wherein the output includes a seat angle detected by the angular position sensor, a range of values includes the predetermined threshold, and the alarm condition exists if the seat angle is not within the range of values.

14. The method of claim 13, wherein outputting the control signal comprises displaying, on a vehicle display, a notification comprising a recommended seat angle adjustment.

15. The method of claim 14, wherein the notification includes a graphical depiction of the recommended seat angle adjustment.

16. The method of claim 12, wherein the sensor unit further includes a contact sensor positioned at a seat location.

17. The method of claim 16, wherein the output includes an occupant contact status detected by the contact sensor, the predetermined threshold is a positive occupant contact status, and the alarm condition exists upon receiving a negative occupant contact status for the seat location.

18. The method of claim 17, wherein outputting the control signal comprises displaying, on the vehicle display, a second notification comprising a recommended posture adjustment including a graphical depiction of the seat location.

19. The method of claim 12, wherein outputting the control signal comprises automatically adjusting the seat position to resolve the alarm condition.

20. The method of claim 12, further comprising reactivating, using the processor, the gear selector when the alarm condition is resolved.

* * * * *